United States Patent
Goto et al.

(10) Patent No.: US 11,554,415 B2
(45) Date of Patent: Jan. 17, 2023

(54) POROUS TITANIUM-BASED SINTERED BODY, METHOD FOR PRODUCING THE SAME, AND ELECTRODE

(71) Applicant: TOHO TITANIUM CO., LTD., Chigasaki (JP)

(72) Inventors: Yasuhiko Goto, Chigasaki (JP); Shogo Tsumagari, Chigasaki (JP); Takahiro Fuji, Chigasaki (JP)

(73) Assignee: TOHO TITANIUM CO., LTD., Kanagawa (JP)

( * ) Notice: Subject to any disclaimer, the term of this patent is extended or adjusted under 35 U.S.C. 154(b) by 0 days.

(21) Appl. No.: 17/040,672

(22) PCT Filed: Mar. 18, 2019

(86) PCT No.: PCT/JP2019/011104
§ 371 (c)(1),
(2) Date: Sep. 23, 2020

(87) PCT Pub. No.: WO2019/188480
PCT Pub. Date: Oct. 3, 2019

(65) Prior Publication Data
US 2021/0016352 A1    Jan. 21, 2021

(30) Foreign Application Priority Data
Mar. 29, 2018    (JP) .............................. JP2018-064588

(51) Int. Cl.
*B22F 3/11*    (2006.01)
*B22F 3/16*    (2006.01)
(Continued)

(52) U.S. Cl.
CPC .................. *B22F 3/11* (2013.01); *B22F 1/05* (2022.01); *B22F 1/065* (2022.01); *B22F 3/16* (2013.01);
(Continued)

(58) Field of Classification Search
CPC ......... B22F 1/05; B22F 3/11; B22F 2003/11; B22F 7/002; B22F 7/004; B22F 2301/205;
(Continued)

(56) References Cited

U.S. PATENT DOCUMENTS

| 2004/0110059 A1 | 6/2004 | Onishi et al. |
| 2008/0199720 A1* | 8/2008 | Liu .......................... C22C 1/08 428/613 |
| 2018/0021854 A1* | 1/2018 | Fukada ..................... B22F 9/10 428/546 |

FOREIGN PATENT DOCUMENTS

| JP | 51-28507 A | 3/1976 |
| JP | 04364858 A * | 12/1992 |

(Continued)

OTHER PUBLICATIONS

International Search Report dated May 14, 2019, issued in counterpart International Application No. PCT/JP2019/011104 (2 pages).
(Continued)

*Primary Examiner* — Vanessa T. Luk
(74) *Attorney, Agent, or Firm* — WHDA, LLP

(57) ABSTRACT

A porous titanium-based sintered body, having a porosity of 45% to 65%, an average pore diameter of 5 μm to 15 μm, and a bending strength of 100 MPa or more. According to the present invention, a porous titanium-based sintered body having good pore diameter and porosity that are compatible with each other and having a high strength can be provided.

7 Claims, 1 Drawing Sheet

(51) Int. Cl.
*C22C 1/08* (2006.01)
*C22C 14/00* (2006.01)
*H01M 4/04* (2006.01)
*H01M 4/134* (2010.01)
*B22F 1/05* (2022.01)
*B22F 1/065* (2022.01)

(52) U.S. Cl.
CPC ............... *C22C 1/08* (2013.01); *C22C 14/00* (2013.01); *H01M 4/0471* (2013.01); *H01M 4/134* (2013.01); *B22F 2301/205* (2013.01); *B22F 2304/10* (2013.01)

(58) Field of Classification Search
CPC ...... B22F 2304/10; B22F 1/06; C22C 1/0458; C22C 1/08; C22C 14/00; C25B 11/031; C25B 11/032; H01M 4/8605; H01M 4/861; H01M 4/8615; H01M 4/8621; H01M 4/8626; H01M 4/8631; H01M 2004/021; H01M 8/023; H01M 8/0232
See application file for complete search history.

(56) References Cited

FOREIGN PATENT DOCUMENTS

| | | | |
|---|---|---|---|
| JP | 2002-66229 A | 3/2002 | |
| JP | 2002-239321 A | 8/2002 | |
| JP | 2002-317207 A | 10/2002 | |
| JP | 2011-99146 A | 5/2011 | |
| JP | 2012-172179 A | 9/2012 | |
| JP | 5573110 B2 | 8/2014 | |
| JP | 2018-70985 A | 5/2018 | |
| JP | 2018070985 A * | 5/2018 | |
| WO | WO-2016140064 A1 * | 9/2016 | ............ B22F 1/0003 |

OTHER PUBLICATIONS

Office Action dated Apr. 6, 2022, issued in counterpart CN application No. 201980020782.6, with English translation. (12 pages).
Extended (Supplementary) European Search Report dated Nov. 24, 2021, issued in counterpart EP Application No. 19774477.4 (6 pages).

* cited by examiner

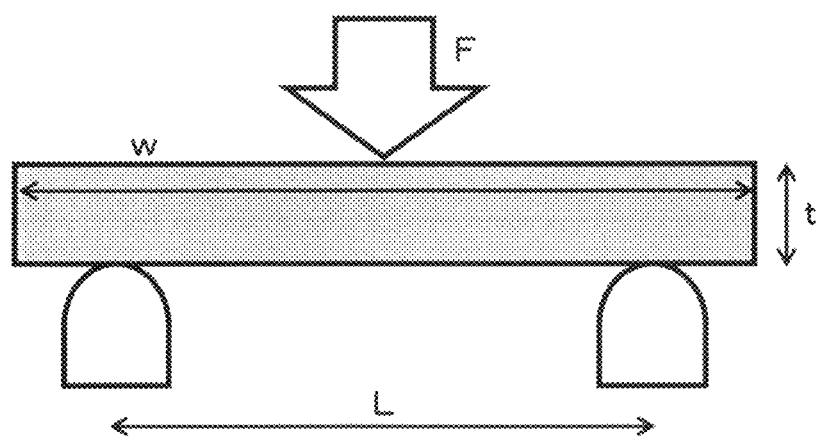

POROUS TITANIUM-BASED SINTERED BODY, METHOD FOR PRODUCING THE SAME, AND ELECTRODE

TECHNICAL FIELD

The present invention relates to a porous titanium-based sintered body, and particularly relates to a porous titanium-based sintered body that is preferably utilized as a filter or an electrode for a fuel battery or a large storage battery.

BACKGROUND ART

Of porous titanium-based sintered bodies obtained by sintering titanium-based powders, a porous titanium-based sintered body obtained by sintering a titanium powder has been used as a filter for a high-temperature melt or the like from long ago, but in recent years, it has come into the limelight also in uses as a base material of an electrode plate for a nickel-metal hydride battery or a lithium battery, a biomaterial, a catalyst base material, a member of a fuel battery, and the like, and development thereof has been promoted.

As a method for producing such a porous titanium-based sintered body, a method for producing a porous titanium sintered body having a high porosity by sintering titanium fibers is disclosed in, for example, Patent Literature 1.

Moreover, a method for producing a sintered body having a porosity of 35% to 55% by sintering spherical particulates obtained by gas atomization of titanium or a titanium alloy is disclosed in, for example, Patent Literature 2.

CITATION LIST

Patent Literature

[Patent Literature 1]
Japanese Patent Laid-Open No. 2012-172179
[Patent Literature 2]
Japanese Patent Laid-Open No. 2002-66229

SUMMARY OF INVENTION

Technical Problem

The porous titanium sintered body obtained by sintering titanium fibers has a high porosity, as in the Patent Literature 1, but studies of a pore diameter and a strength have not been made.

The porous titanium sintered body obtained by sintering a spherical titanium powder produced by a gas atomization method, as in the Patent Literature 2, has a low porosity, but because of a large circularity, it has few contact points of the powder particles, and has a low strength, so that there has been a demand for improvement in the strength.

Recently, there is an increasing tendency to desire a structural strength of a porous titanium-based sintered body. The reason is that when a filter or an electrode is taken as one structural member, lowering of strength leads to occurrence of defective products such as broken products.

However, when the strength of a porous body is increased, the porosity generally decreases. In detail, as a powder or the like that becomes a raw material of the porous body becomes denser, the strength of the sintered body increases.

Here, in uses in which pressure loss occurs, such as a filter, gas permeability or liquid permeability can be improved because the strength is high. However, even if a pressure is applied, the gas permeability or the liquid permeability of the porous body does not easily increase unless appropriate pores are ensured and the porosity is high. Therefore, there has been a demand for making good pore diameter and porosity compatible with each other and for increasing a strength in a metallic porous body.

Accordingly, it is an object of the present invention to provide a porous titanium-based sintered body having good pore diameter and porosity that are compatible with each other and having a high strength.

Solution to Problem

In order to solve the above problem, the present inventors had earnestly studied, and they had acquired the following knowledge.

The present inventors have adopted, as a metal material, a titanium-based powder that was relatively lightweight among metals. Further, the present inventors had presumed that a titanium-based powder that was a crushed product, not a titanium-based powder having a high circularity produced by a gas atomization method, was effective. The crushed product had an ununiform shape as compared with the gas atomization product and had many angular parts. Therefore, the present inventors had thought that there were many contact points of the powder particles, and the powder particles form a bridge, so that a high porosity could be ensured. They have further thought that if a sintered area was appropriately ensured in a state where many contact points were present, an increase in strength could be achieved while good pore diameter and porosity were realized.

On the other hand, if a powder having a high circularity, such as a gas atomization product, was used, the number of particles filled in a certain space increases, and therefore, the porosity was decreased. Moreover, since the circular powder particles had few contact points, it was hard to ensure favorable sintering points, and a desired strength might not be obtained.

On the basis of the above knowledge, the present inventors had made various studies on the particle diameter of a titanium-based powder that became a raw material and the sintering temperature thereof, and as a result, they had acquired knowledge that it was effective to intensively utilize a fine powder having D90 of a specific value or less in the particle size distribution measurement and to sinter the powder in the specific temperature region. The present inventors have made further studies, and they have achieved a high strength of 100 MPa or more while realizing a porosity of 45% or more and an average pore diameter of 5 µm to 15 µm.

Such a porous titanium-based sintered body has a high strength and thereby is excellent in pressure resistance, and it has good pore diameter and porosity and thereby is excellent in gas permeability or liquid permeability. When the porous titanium-based sintered body is used as a gas generating electrode, it favorably takes away a gas generated in the electrode toward the outside of the electrode. Hence, the porous titanium-based sintered body not only is excellent in strength but also can suppress breakage attributable to the gas generation.

On the bases of the above knowledge, the present invention has been completed.

That is to say, the present invention (1) provides a porous titanium-based sintered body, having a porosity of 45% to 65%, an average pore diameter of 5 µm to 15 µm, and a bending strength of 100 MPa or more.

The present invention (2) provides an electrode comprising the porous titanium-based sintered body of (1).

The present invention (3) provides a method for producing a porous titanium sintered body, comprising the step of placing a titanium-based powder having an average circularity of 0.93 or less and having D90, as obtained by particle size distribution measurement, of 25 μm or less in a mold by dry process without substantially applying pressure, and the step of sintering the powder at 850° C. or higher and lower than 950° C.

Advantageous Effect of Invention

According to the present invention, a porous titanium-based sintered body having good pore diameter and porosity that are compatible with each other and having a high strength is provided.

BRIEF DESCRIPTION OF DRAWING

FIG. 1 is a schematic view to describe a bending test for determining a bending strength.

DESCRIPTION OF EMBODIMENTS

The porous titanium-based sintered body of the present invention has a porosity of 45% to 65%, an average pore diameter of 5 μm to 15 μm, and a bending strength of 100 MPa or more. Usually, the porous titanium-based sintered body is a sintered body of a particulate titanium-based powder and has many pores inside.

The titanium-based powder according to the present invention is a titanium powder, a hydrogenated titanium powder, a titanium powder coated with titanium nitride or titanium silicide, a titanium alloy powder, or a composite material of a combination thereof. Examples of the titanium-based powders in the present invention include a titanium powder formed of metallic titanium and inevitable impurities, and a titanium alloy powder formed of metallic titanium, an alloy metal and inevitable impurities. The titanium-based powder according to the present invention may be a crushed powder such as HDH powder (hydrogenation-dehydrogenation powder). For example, the titanium alloy is an alloy of titanium and a metal (alloy metal) comprising one or more of Fe, Sn, Cr, Al, V, Mn, Zr or Mo, and specific examples thereof include Ti-6-4 (Ti-6Al-4V), Ti-5Al-2.5Sn, Ti-8-1-1 (Ti-8Al-1Mo-1V), Ti-6-2-4-2 (Ti-6Al-2Sn-4Zr-2Mo-0.1Si), Ti-6-6-2 (Ti-6Al-6V-2Sn-0.7Fe-0.7Cu), Ti-6-2-4-6 (Ti-6Al-2Sn-4Zr-6Mo), SP700 (Ti-4.5Al-3V-2Fe-2Mo), Ti-17 (Ti-5Al-2Sn-2Zr-4Mo-4Cr), β-CEZ (Ti-5Al-2Sn-4Zr-4Mo-2Cr-1Fe), TIMETAL555, Ti-5553 (Ti-5Al-5Mo-5V-3Cr-0.5Fe), TIMETAL21S (Ti-15Mo-2.7Nb-3Al-0.2Si), TIMETAL LCB (Ti-4.5Fe-6.8Mo-1.5Al), 10-2-3 (Ti-10V-2Fe-3Al), Beta C (Ti-3Al-8V-6Cr-4Mo-4Cr), Ti-8823 (Ti-8Mo-8V-2Fe-3Al), 15-3 (Ti-15V-3Cr-3Al-3Sn), BetaIII (Ti-11.5Mo-6Zr-4.5Sn), and Ti-13V-11Cr-3Al. In the above, the number attached before each alloy metal indicates a content (mass %). For example, "Ti-6Al-4V" indicates a titanium alloy containing 6 mass % of Al and 4 mass % of V as an alloy metal.

In the porous titanium-based sintered body of the present invention, by setting the porosity to 45% to 65%, enhancement of gas permeability or liquid permeability is achieved, and an increase in strength is also achieved. If the porosity is less than 45%, there is a possibility that good gas permeability or liquid permeability cannot be ensured. On the other hand, a porosity of more than 65% means that the porous titanium-based sintered body is too coarse, and there is concern that a desired strength cannot be ensured. The lower limit side of the porosity of the porous titanium-based sintered body of the present invention is preferably 48% or more, and more preferably 50% or more. On the other hand, the upper limit side of the porosity of the porous titanium-based sintered body of the present invention may be 63% or less, or may be 60% or less. The upper limit side of the porosity of the porous titanium-based sintered body may be 55% or less, or may be 53% or less.

The porosity is a proportion of voids per unit volume of the porous titanium-based sintered body and is expressed as percentage. In the present invention, the porosity is calculated from the following expression using a volume V (cm$^3$) of the porous titanium-based sintered body, a mass M (g) of the porous titanium-based sintered body, and a true density D (g/cm$^3$) of a metal part that forms the sintered body (e.g., true density of pure titanium: 4.51 g/cm$^3$). The volume V indicates an apparent volume of the porous titanium-based sintered body.

$$\text{Porosity (\%)} = 100 - ((M/V)/D) \times 100)$$

In the porous titanium-based sintered body of the present invention, by setting the average pore diameter to 5 μm to 15 μm, enhancement of gas permeability or liquid permeability is achieved, and an increase in strength is also achieved. If the average pore diameter is less than 5 μm, there is a fear that bonding of fine particles to each other may have proceeded excessively, and a desired porosity and a high strength may not be made compatible. On the other hand, if the average pore diameter exceeds 15 μm, the strength tends to become insufficient. The lower limit side of the average pore diameter of the porous titanium-based sintered body of the present invention is preferably 7 μm or more, and more preferably 8 μm or more. The lower limit side of the average pore diameter of the porous titanium-based sintered body is still more preferably 10 μm or more, and even more preferably 11 μm or more. The upper limit side of the average pore diameter of the porous titanium-based sintered body of the present invention is preferably 14 μm or less. The upper limit side of the average pore diameter of the porous titanium-based sintered body is more preferably 12 μm or less.

In the present invention, the average pore diameter is determined by a mercury penetration method (Washburn model).

$$\text{Average pore diameter (μm)} = 2 \times V_P / S_P$$

wherein $V_P$ is a pore volume (cc/g), and $S_P$ is a pore specific surface area (m$^2$/g).

—Measurement Conditions: JIS R 1655 (2003)—
Pressure measuring method: strain-gauge method
Temperature: room temperature
Pretreatment: After pressure reduction to about 6 Pa at room temperature, mercury penetration is started.

In the porous titanium-based sintered body of the present invention, a bending strength of 100 MPa or more can be attained. It is thought that this high strength is attained because proper sintering of fine particles is simultaneously obtained at many points in the present invention. The bending strength of the porous titanium-based sintered body of the present invention is preferably 110 MPa or more, more preferably 120 MPa or more, and still more preferably 130 MPa or more. The upper limit of the bending strength of the porous titanium-based sintered body of the present invention is not particularly set, but for example, it may be 170 MPa or less, or may be 160 MPa or less.

The bending strength is a mechanical property having been reduced in influence of thickness or length of a specimen. In the present invention, the bending strength is determined in accordance with JIS 22248 (2006) "Metallic materials-Bend test". The conditions adopted in the example described later are as follows.

Specimen size: 15 mm×50 mm×0.5 mm
Test temperature: 23° C.
Indentation rate: 2.0 mm/min
Inter-fulcrum distance: 40 mm
Bending radius (indenter/lower fulcrum tip): R 5 mm
Specimen setting direction: A surface having high surface roughness is regarded as an indenter side, and a maximum load (N) is determined. Using the following expression, conversion into a bending strength is carried out.

$$\sigma = \frac{M_{max}}{Z} = \frac{F_{max}L}{4} \bigg/ \frac{wt^2}{6} = \frac{3F_{max}L}{2wt^2} \qquad \text{[Expression 1]}$$

σ: bending strength (MPa), F: (bending) load (N), L: inter-fulcrum distance (mm), t: specimen thickness (mm), w: specimen width (mm), Z: section modulus*[1] (mm$^3$), M: bending moment*[2] (N·mm)
*1: Section modulus Z=wt$^2$/6 (value determined by only a shape of section)
*2: Bending moment M=$F_{max}$×L/4 (because pressure is applied to the center of the sample)

Next, the method for producing a porous titanium-based sintered body of the present invention will be described.

The method for producing a porous titanium-based sintered body of the present invention is a method for producing a porous titanium sintered body, comprising the step of placing a titanium-based powder having an average circularity of 0.93 or less and having D90, as obtained by particle size distribution measurement, of 25 μm or less in a mold by dry process without substantially applying pressure, and the step of sintering the powder at 850° C. or higher and lower than 950° C.

The average circularity of the titanium-based powder for use in the production method of the present invention is 0.93 or less. By setting the average circularity to 0.93 or less, good pore diameter and porosity are made compatible. An average circularity of more than 0.93 means that the titanium-based powder comes too close to a spherical shape. That is to say, the porosity of the porous titanium-based sintered body becomes insufficient, and the contact points of the powder particles cannot be ensured, so that there is concern that the desired strength cannot be attained. The average circularity of the titanium-based powder for use in the production method of the present invention is preferably 0.91 or less, and more preferably 0.89 or less.

In the present invention, the average circularity of the titanium-based powder is determined by the following method. Using an electron microscope, a perimeter (A) of a projected area of a particle is measured, and when a perimeter of a circle having the same area as the projected area is taken as (B), B/A is taken as a circularity. The average circularity is obtained by pouring particles together with a carrier liquid into a cell, photographing images of a large amount of particles by a CCD camera, measuring a perimeter (A) of a projected area of each particle and a perimeter (B) of a circle having the same area as the projected area from each particle image of 1000 to 1500 particles, calculating a circularity, and determining an average value of circularities of the particles.

As the shape of the particle comes close to a true sphere, the numerical value of the circularity increases, and the circularity of a particle having a shape of a perfect true sphere becomes 1. Contrary to this, as the shape of the particle becomes further away from a true sphere, the numerical value of the circularity decreases.

The titanium-based powder for use in the production method of the present invention has D90, as obtained by particle size distribution measurement, of 25 μm or less. By intensively utilizing fine particles, a desired strength is attained. That the D90 of the titanium-based powder exceeds 25 μm means too large particles. That is to say, a pore diameter and a porosity desired in the present invention are not obtained. D90 of the titanium-based powder for use in the production method of the present invention is preferably 23 μm or less. The lower limit side of D90 of the titanium-based powder may be 18 μm or more, or may be 20 μm or more.

In the titanium-based powder for use in the production method of the present invention, D50 as obtained by particle size distribution measurement is also preferably defined. It is preferable to set D50 of the titanium-based powder to 9 μm or more and 15 μm or less. The lower limit side of D50 of the titanium-based powder for use in the production method of the present invention is preferably 11 μm or more. The upper limit side of D50 of the titanium-based powder may be 14 μm or less, or may be 13 μm or less. By setting D50 of the titanium-based powder in the above range, preferred fine particles can be more intensively utilized.

In the present invention, D50 and D90 indicate particle diameters by which volume-based cumulative distributions in the measurement of particle size distribution as determined by a laser diffraction/scattering method become 50% and 90%, respectively. In detail, the titanium-based powder particle size distribution is measured by the following method, and D50 and D90 are measured. That is to say, they are measured based on JIS Z8825:2013.

The average circularity of the titanium-based powder for use in the production method of the present invention can be appropriately controlled. For example, the average circularity can be controlled by mixing titanium-based powders having different average circularities from each other. Also regarding D50 and D90 of the titanium-based powder, D50 and D90 can be each controlled by, for example, mixing titanium-based powders having different values.

In the porous titanium-based sintered body produced by the production method of the present invention, the porosity and the average pore diameter can be controlled by controlling the average circularity and the particle size distribution of the titanium-based powder that is a raw material. For example, if a large amount of the powder is allowed to be present on the fine particle side in the particle size distribution, the porosity and the average pore diameter can be decreased. If a large amount of the powder is allowed to be present on the coarse particle side in the particle size distribution, the porosity and the average pore diameter can be increased. Changes of the porosity and the average pore diameter are not always correlated with each other, but based on the control of the average circularity and the particle size distribution of the titanium-based powder, the porosity and the average pore diameter of the porous titanium-based sintered body can be controlled.

In the production method of the present invention, the titanium-based powder is placed in a mold by dry process without substantially applying pressure. By placing the titanium-based powder in the mold by dry process without substantially applying pressure, a bulk density (density at the time of filling) is maintained, and a sintered body having a high porosity is obtained. On the other hand, if the titanium-based powder is placed in the mold by wet process, the titanium-based powder accumulates while having anisotropy because of resistance of a fluid, and therefore, the porosity does not increase up to a desired value. If the titanium-based powder is placed in a mold by wet process, the titanium-based powder may be filled densely up to a density equivalent to tap density. Moreover, if the pressure applied to the upper surface of the titanium-based powder in a mold is too high when the titanium-based powder is placed in the mold, the porosity does not increase.

In the present invention, the expression "without substantially applying pressure" indicates that excepting a force applied to the titanium-based powder under the titanium-based powder's own weight when the titanium-based powder is filled in the mold or a force applied to the upper surface of the titanium-based powder in the mold when the titanium-based powder that has overflown and is present above the upper edge of the mold is leveled off after filling of the titanium-based powder in the mold, the pressure of a force intendedly applied to the upper surface of the titanium-based powder in the mold is $1 \times 10^{-2}$ MPa/mm$^2$ or less. The pressure applied to the upper surface of the titanium-based powder in the mold is a value obtained by dividing the force applied to the whole of the upper surface of the titanium-based powder-filled part of the mold by the area of the upper surface of the filled part. In the present invention, the expression "dry process" indicates that water or an organic solvent is not intendedly used.

A material of the mold for use in the present invention can be appropriately selected as long as the material does not react with the titanium-based powder, can withstand high temperatures and can be inhibited from thermal expansion. For example, quartz, alumina, graphite, carbon, cordient, indium oxide, calcia, silica, magnesia, zirconia, spinel, silicon carbide, aluminum nitride, boron nitride or mullite is preferable as the material of the mold. A more preferred material of the mold is quartz, alumina, carbon, calcia, magnesia, zirconia, boron nitride or the like by the reason of good workability.

In the production method of the present invention, the titanium-based powder is sintered at 850° C. or higher and lower than 950° C. The sintering temperature is the highest reaching temperature during sintering. By the sintering in this temperature range, good pore diameter and porosity of the porous titanium-based sintered body produced are made compatible, and a high strength of the porous titanium-based sintered body is attained. If the sintering temperature is lower than 850° C., there is concern that proper sintering of the fine particles desired in the present invention is not obtained. On the other hand, if the sintering temperature is 950° C. or higher, sintering of the fine particles excessively proceeds, and a porosity and a strength desired in the present invention may not be made compatible. In the production method of the present invention, the lower limit side of the sintering temperature is preferably 870° C. or higher, and more preferably 890° C. or higher. In the production method of the present invention, the upper limit side of the sintering temperature is preferably 930° C. or lower, and more preferably 920° C. or lower.

In the production method of the present invention, the sintering time for sintering the titanium-based powder is appropriately selected according to the size of a sintering furnace, the size of the porous titanium-based sintered body to be produced, etc.

In the method for producing a porous titanium-based sintered body of the present invention, sintering of the titanium-based powder is usually carried out under reduced pressure. Examples of methods for sintering the titanium-based powder include:

(1) a method comprising placing the titanium-based powder in a mold, then installing pressure reducing means in the mold, tightly closing the mold, reducing the pressure inside the mold by the pressure reducing means, then removing the pressure reducing means while maintaining a state of reduced pressure, setting the mold in a sintering furnace, and heating the titanium-based powder to sinter the powder;

(2) a method comprising placing the titanium-based powder in a mold, then installing pressure reducing means in the mold, tightly closing the mold, setting the mold in a sintering furnace, reducing the pressure inside the mold by the pressure reducing means in the furnace, and heating the titanium-based powder to sinter the powder after terminating pressure reduction or while further continuing pressure reduction; and (3) a method comprising placing the titanium-based powder in a mold, then setting the mold in a sintering furnace, reducing the pressure inside the furnace together with the mold, and heating the titanium-based powder to sinter the powder after terminating pressure reduction or while further continuing pressure reduction.

In the present invention, the pressure of an atmosphere in which the titanium-based powder is sintered is preferably $5.0 \times 10^{-3}$ Pa or less. If the pressure of the atmosphere is too high, the titanium-based powder is oxidized by excess oxygen present in the atmosphere, and the sintering does not easily take place.

As the porous titanium-based sintered body of the present invention, one obtained by placing a titanium-based powder having an average circularity of 0.93 or less and having D90, as obtained by particle size distribution measurement, of 25 μm or less in a mold by dry process without substantially applying pressure, and then sintering the powder at 850° C. or higher and lower than 950° C. (hereinafter, also referred to as a porous titanium-based sintered body of a first embodiment of the present invention) can be mentioned.

The titanium-based power according to the porous titanium-based sintered body of the first embodiment of the present invention is the same as the titanium-based powder according to the porous titanium-based sintered body of the present invention. That is to say, the average circularity of the titanium-based powder according to the porous titanium-based sintered body of the first embodiment of the present invention is 0.93 or less. The average circularity of the titanium-based powder is preferably 0.91 or less, and more preferably 0.89 or less. On the other hand, since an average circularity of more than 0.93 means that the titanium-based powder comes too close to a spherical shape, the porosity of the porous titanium-based sintered body becomes insufficient, and the contact points of the powder particles cannot be ensured, so that there is concern that the desired strength cannot be attained.

The titanium-based powder according to the porous titanium-based sintered body of the first embodiment of the present invention has D90, as obtained by particle size distribution measurement, of 25 μm or less, preferably 23 μm or less. By intensively utilizing fine particles, a desired strength is attained. That the D90 of the titanium-based powder exceeds 25 μm means too large particles, and therefore, a pore diameter and a porosity desired in the present invention are not obtained. The lower limit side of D90 of the titanium-based powder may be 18 μm or more, or may be 20 μm or more.

D50 of the titanium-based powder according to the porous titanium-based sintered body of the first embodiment of the present invention is preferably 9 μm or more and 15 μm or less. The lower limit side of D50 of the titanium-based powder according to the porous titanium-based sintered body of the first embodiment of the present invention is preferably 11 μm or more. By setting D50 of the titanium-based powder in the above range, preferred fine particles can be more intensively utilized. The upper limit side of D50 of the titanium-based powder may be 14 μm or less, or may be 13 μm or less.

The porous titanium-based sintered body of the first embodiment of the present invention is one obtained by placing the titanium-based powder in a mold by dry process without substantially applying pressure, heating the powder under reduced pressure, preferably at $5.0 \times 10^{-3}$ Pa or less, and thereby sintering the powder.

The sintering temperature of the titanium-based powder is 850° C. or higher and lower than 950° C. By the sintering in this temperature range, good pore diameter and porosity of the porous titanium-based sintered body produced are made compatible, and a high strength of the porous titanium-based sintered body is attained. The sintering temperature is the highest reaching temperature during sintering. If the sintering temperature is less than 850° C., there is concern that proper sintering of the fine particles desired in the present invention is not obtained. On the other hand, if the sintering temperature is 950° C. or higher, sintering of the fine particles excessively proceeds, and a porosity and a high strength desired in the present invention may not be obtained. The lower limit side of the sintering temperature of the titanium-based powder is preferably 870° C. or higher, and the upper limit side of the sintering temperature is preferably 920° C. or lower.

The porosity of the porous titanium-based sintered body of the first embodiment of the present invention is 45% to 65%. By setting the porosity of the porous titanium-based sintered body of the first embodiment of the present invention in the above range, enhancement of gas permeability or liquid permeability is achieved, and an increase in strength is achieved. If the porosity is less than 45%, there is a possibility that good gas permeability or liquid permeability cannot be ensured. On the other hand, a porosity of more than 65% means that the porous titanium-based sintered body is too coarse, and there is concern that a desired strength cannot be ensured. The lower limit side of the porosity of the porous titanium-based sintered body of the first embodiment of the present invention is preferably 48% or more, and more preferably 50% or more. On the other hand, the upper limit side of the porosity of the porous titanium-based sintered body of the first embodiment of the present invention may be 63% or less, or may be 60% or less. The upper limit side of the porosity of the porous titanium-based sintered body of the first embodiment of the present invention may be 55% or less, or may be 53% or less.

The average pore diameter of the porous titanium-based sintered body of the first embodiment of the present invention is 5 μm to 15 μm. By setting the average pore diameter of the porous titanium-based sintered body of the first embodiment of the present invention in the above range, enhancement of gas permeability or liquid permeability is achieved, and an increase in strength is achieved. If the average pore diameter is less than 5 μm, there is a fear that bonding of fine particles to each other has excessively proceeded, and a desired porosity and a high strength may not be made compatible. On the other hand, if the average pore diameter exceeds 15 μm, the strength becomes insufficient. The lower limit side of the average pore diameter of the porous titanium-based sintered body of the first embodiment of the present invention is preferably 7 μm or more, and more preferably 8 μm or more. The lower limit side of the average pore diameter of the porous titanium-based sintered body of the first embodiment of the present invention is still more preferably 10 μm or more, and even more preferably 11 μm or more. The upper limit side of the average pore diameter of the porous titanium-based sintered body of the first embodiment of the present invention is preferably 14 μm or less. The upper limit side of the average pore diameter of the porous titanium-based sintered body of the first embodiment of the present invention is more preferably 12 μm or less.

The bending strength of the porous titanium-based sintered body of the first embodiment of the present invention is 100 MPa or more. It is thought that this high strength is attained because proper sintering of fine particles can be simultaneously obtained at many points in the present invention. The bending strength of the porous titanium-based sintered body of the first embodiment of the present invention is preferably 110 MPa or more, more preferably 120 MPa or more, and still more preferably 130 MPa or more. The upper limit of the bending strength of the porous titanium-based sintered body of the first embodiment of the present invention is not particularly set, but for example, it may be 170 MPa or less, or may be 160 MPa or less.

The porous titanium-based sintered body of the first embodiment of the present invention is one obtained by placing a titanium-based powder having an average circularity of 0.93 or less and having D90, as obtained by particle size distribution measurement, of 25 μm or less in a mold by dry process without substantially applying pressure, and then sintering the powder at 850° C. or higher and lower than 950° C., and therefore, it has a high porosity, a small average pore diameter and a high strength.

The present invention will be described in more detail with reference to an example, but this example is just an example and does not limit the present invention.

EXAMPLE

In the following example, a titanium powder produced by a hydrogenation/dehydrogenation method and having a shape of a crushed product was used as a titanium-based powder. An average circularity, D50 and D90 of the titanium-based powder used are set forth in Table 1.

In the measurement, the average circularity was determined using PITA-3 (manufactured by SEISHIN ENTERPRISE CO., LTD.). D50 and D90 were determined in accordance with JIS:Z8825:2013 using a measuring device: LMS-350 (manufactured by SEISHIN ENTERPRISE CO., LTD.).

Example and Comparative Examples

Each titanium-based powder was filled in a quartz mold under the drying and no-pressure application conditions, and a titanium-based powder having overflown and present above the upper edge of the mold was leveled off. That is to say, any excess force other than a force of leveling operation was not applied to the titanium-based powder. Thereafter, in environment in which the degree of vacuum was set to at least $3.0×10^{-3}$ Pa, the mold filled with the titanium-based powder was placed, then the powder was sintered up to a sintering temperature shown in Table 1 at a temperature rise rate of 15° C./min, and sintering was carried out for 1 hour. After the sintering, the resulting sinter was cooled down to room temperature by furnace cooling, thereby obtaining a porous sintered body of the titanium-based powder.

The resulting porous titanium-based sintered body was subjected to analyses to determine a porosity, an average pore diameter and a bending strength. The results are set forth in Table 1.

Regarding the measurement of the porosity, the aforesaid calculation method (calculation backward from relative density) was used to determine the porosity. The average pore diameter was measured by a strain-gauge type pressure measuring method using a mercury penetration measuring device manufactured by Micromeritics Instrument Corporation. Regarding the bending strength, a maximum load was measured by a method whose outline is shown in FIG. 1, using a universal testing machine manufactured by SHIMADZU CORPORATION, and it was converted into a bending strength.

TABLE 1

| No. | Titanium powder properties | | | Sintering temperature (° C.) | Porosity (%) | Average pore diameter (μm) | bending strength (MPa) |
| --- | --- | --- | --- | --- | --- | --- | --- |
| | Average circularity | D50 (μm) | D90 (μm) | | | | |
| 1 | 0.88 | 12 | 21 | 900 | 55 | 9 | 114.9 |
| 2 | 0.77 | 36 | 49 | 900 | 62 | 16 | 36.9 |
| 3 | 0.79 | 77 | 106 | 900 | 64 | 15 | 15.7 |
| 4 | 0.79 | 77 | 106 | 900 | 64 | 17 | 19.0 |
| 5 | 0.82 | 76 | 106 | 900 | 59 | 29 | 18.7 |
| 6 | 0.88 | 14 | 19 | 900 | 55 | 10 | 116.1 |
| 7 | 0.88 | 12 | 22 | 900 | 52 | 11 | 152.3 |

No. 1, No. 6 and No. 7 that were the invention examples were excellent in fine particle shape, particle size distribution and sintering temperature. Therefore, the porous titanium-based sintered bodies produced had a porosity and an average pore diameter of preferred values, and were porous titanium-based sintered bodies of high strength. It is presumed that if the strength is attempted to be increased by a conventional method without carrying out control of the powder properties of the titanium-based powder, the porosity markedly decreases though the strength increases. In contrast therewith, in No. 1, No. 6 and No. 7 that were the invention examples, control of the powder properties of the titanium-based powder in the present invention was carried out, and therefore, the strength increased while a high porosity was maintained. Particularly in No. 7 of the invention examples, an extremely high strength could be attained by controlling the porosity and/or the average pore diameter.

In No. 2 to No. 5 that were comparative examples, D90 was too large. Therefore, although the porosity after the production could be sufficiently ensured, an average pore diameter desired in the present invention was not obtained, and a desired strength was not attained.

The invention claimed is:

1. A method for producing a porous titanium-based sintered body, comprising the step of placing a titanium-based powder having an average circularity of 0.93 or less and having D90, as obtained by particle size distribution measurement, of 25 μm or less in a mold by dry process without substantially applying pressure, and the step of sintering the powder at 850° C. or higher and lower than 950° C.

2. The method for producing a porous titanium-based sintered body according to claim 1, wherein the average circularity of the titanium-based powder is 0.89 or less.

3. The method for producing a porous titanium-based sintered body according to claim 1, wherein the D90 of the titanium-based powder is 18 μm or more.

4. The method for producing a porous titanium-based sintered body according to claim 1, wherein D50 of the titanium-based powder is 9 to 15 μm.

5. The method for producing a porous titanium-based sintered body according to claim 1, wherein the titanium-based powder is one or more selected from a titanium powder and a hydrogenated titanium powder.

6. The method for producing a porous titanium-based sintered body according to claim 1, wherein the step of sintering is a step of sintering at 890 to 920° C.

7. The method for producing a porous titanium-based sintered body according to claim 1, wherein the step of sintering is carried out in a reduced-pressure atmosphere of $5.0×10^{-3}$ Pa or less.

* * * * *